Oct. 20, 1970  W. E. NEITZEL  3,535,531
HIGH-VOLUME AIRBORNE-PARTICLE LIGHT SCATTERING
DETECTOR SYSTEM HAVING RECTANGULARLY SHAPED
ELONGATED SCANNING ZONE

Filed July 31, 1968

William E. Neitzel
*INVENTOR.*

BY

Oct. 20, 1970　　　　　　　W. E. NEITZEL　　　　　　　3,535,531
HIGH-VOLUME AIRBORNE-PARTICLE LIGHT SCATTERING
DETECTOR SYSTEM HAVING RECTANGULARLY SHAPED
ELONGATED SCANNING ZONE
Filed July 31, 1968　　　　　　　　　　　　　　　　2 Sheets-Sheet 2

William E. Neitzel
*INVENTOR.*

BY

United States Patent Office 3,535,531
Patented Oct. 20, 1970

3,535,531
HIGH-VOLUME AIRBORNE-PARTICLE LIGHT SCATTERING DETECTOR SYSTEM HAVING RECTANGULARLY SHAPED ELONGATED SCANNING ZONE
William E. Neitzel, Albuquerque, N. Mex., assignor to the United States of America as represented by the United States Atomic Energy Commission
Filed July 31, 1968, Ser. No. 749,047
Int. Cl. H01j *39/12;* G01n *21/26;* G02f *1/28*
U.S. Cl. 250—217      4 Claims

ABSTRACT OF THE DISCLOSURE

A system for detecting airborne-particles in a high volume air sample using a beam of collimated light having an elongated cross section transmitted through a stream of sampling air also having an elongated cross section, so that the air volume being sampled at any given time in the sensing zone has a generally parallelepiped shape, and reflector means for reflecting only the light scattered by particles in the air stream to a light measuring means.

BACKGROUND OF INVENTION

Various devices and techniques have been employed to detect and/or measure small particles, such as bacteria, dust, pollen and the like in air or other gases or fluids. One of these techniques illuminates a sample of air and then detects any light scattered from particles carried by the air sample. The amount or amplitude of light scattered by a particle is directly proportional to the size of the particle and the amplitude of the light illuminating the particle. As a result, for accurate particle detection and sizing, it is important that all areas of the air sample be illuminated by constant and equal light intensity at all times and that all unscattered light be efficiently absorbed or blocked from the scattered light detector. Prior light scattering particle detection devices have produced excessive secondary emissions and have presented varying amounts or thickness of material capable of absorbing or attenuating light to light rays passing along different paths between a light source and the scattering detector, including the air sample itself. The effect of this has been to present widely varying light intensities to different portions of the air sample and consequently to different particles passing through these portions. Thus, the amplitude of light scattered from a given size particle may vary depending on the position of the particle in the air sample.

Presently available airborne-particle monitors are capable of sampling only a relatively small volume of air over a given period of time, generally less than 1 cubic foot per minute and more often less than 1 cubic foot per hour. At these low sampling rates, the sampling devices have correspondingly low response times to a potential contaminating particle excursion. In modern technology and microbiology where ultra-cleanliness of particle-free conditions must be maintained, this response time may be critical to prevent undue contamination of equipment and/or personnel, this becomes even more critical within the recently developed laminar flow clean rooms and clean benches and hoods where large volumes of filtered air, upwards of 100 cubic feet per minute per square foot of area, are pumped through to maintain a particle-free atmosphere. Where such large volumes of air are used a considerably higher representative sample of this air than that previously achieved is necessary to determine what level of contamination is being maintained and to prevent a long lapse time between the occurrence of a contamination problem and the time a particle monitor indicates a problem has occurred.

SUMMARY OF INVENTION

In view of the limitations of the prior art as noted above, it is an object of this invention to provide airborne-particle detection devices which provide a rapid response time.

It is a further object of this invention to provide light scattering type of airborne-particle detection devices which can accurately measure particle size regardless of location of the particle in an air sample.

It is a further object of this invention to provide airborne-particle detection devices which are capable of accurate, high volume scanning of air samples.

Various other objects and advantages will appear from the following description of embodiments of the invention, and the most novel features will be particularly pointed out hereinafter in connection with the appended claims.

The invention comprises an airborne-particle detector including a beam of collimated light having an elongated cross section intersecting a stream of sampling air, also having an elongated cross section, and reflector means for reflecting only the light scattered from particles in the air stream to a light measuring means.

DESCRIPTION OF DRAWINGS

Various embodiments of the present invention are shown in the accompanying drawings wherein.

DETAILED DESCRIPTION

Figure 1:
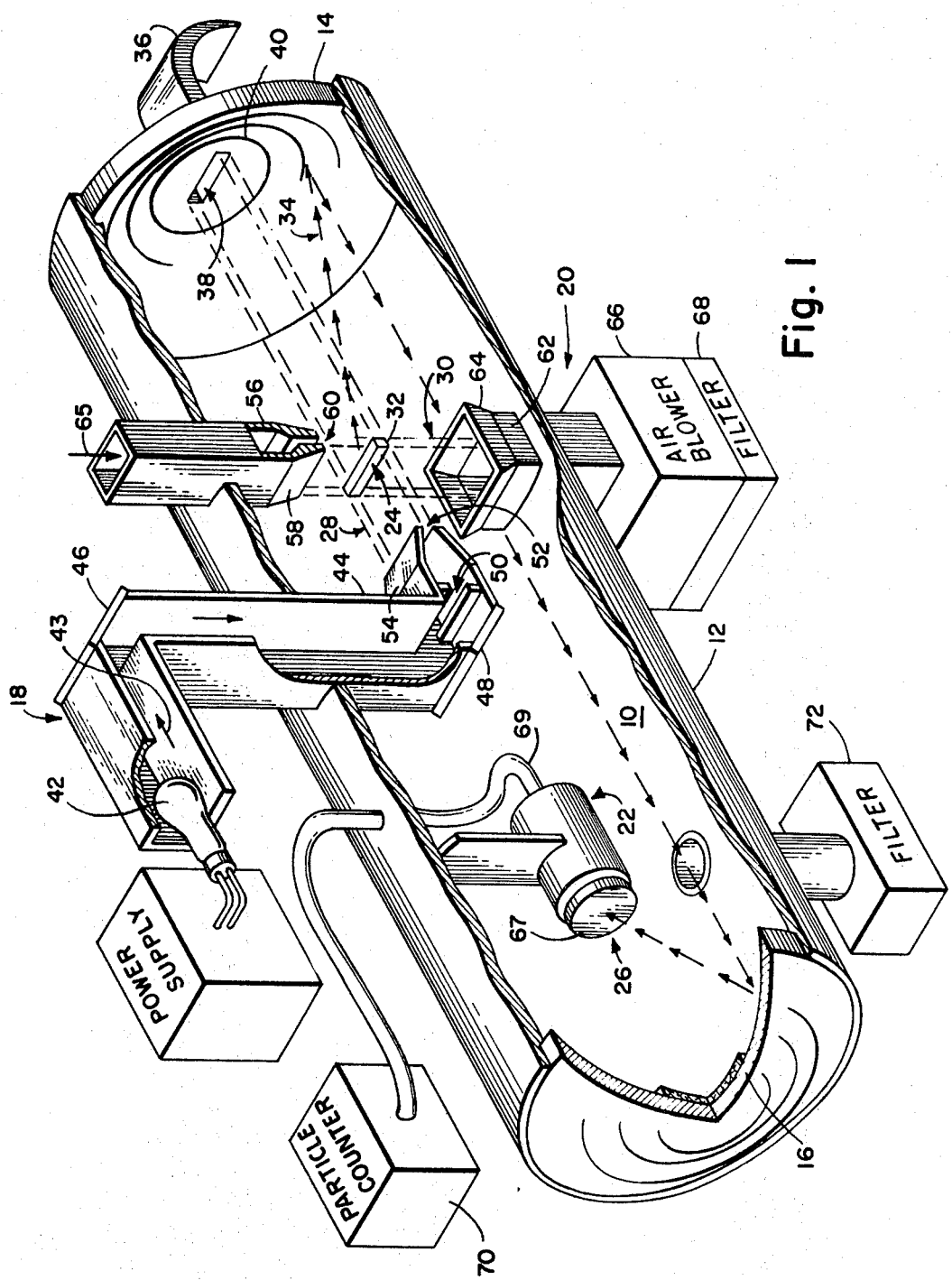
FIG. 1 is a perspective view, partially in cross section, of an airborne-particle detection system illustrating the features of this invention.

In the embodiment of the invention shown in FIG. 1 the airborne-particle detector includes an optical chamber 10 formed by a housing 12 closed at both ends by reflectors 14 and 16, a light generator and transmitter 18, air stream generator 20 and a scattered light detector and measuring means 22. Housing 12 may be any convenient shape or form such as tubular as shown, having all inner surface covered by a non-reflective coating or paint and joints or couplings suitably sealed so as to minimize or prevent light reflection and leakage into or out of the optical chamber. Reflectors 14 and 16 may be any conventional arcuate or curved (such as parabolic or spherical) preferably first surface, reflector or mirror (hereinafter referred to for purpose of desciption simply as a reflector), having focal zones or positions 24 and 26 respectively and high degree of reflectivity. Such reflectors are characterized by having a single major or principal focal point on their principal axis included within focal positions 24 and 26 from which or to which parallel travelling light rays will pass when reflected from the reflector face. Such reflectors are also characterized by a plurality of paired object and image focal points on the major axis of the reflector other than the principal focal point. Reflectors 14 and 16 are positioned facing each other with contiguous principal axes which in turn may be contiguous with an axis of optical chamber 10, such as the longitudinal axis of housing 12.

The light generator 18 produces a collimated beam of light 28 having an elongated and preferably rectangular cross section (that is, a beam having a long and short dimension and preferably squared-off end portions on a cross section taken perpendicular to the direction of travel of the beam) and then transmits or directs the beam along the principal axis of reflector 14 and through its focal position 24 and principal focal point. Air stream generator 20 forms a stream of air 30 to be monitored having the same general elongated and preferably rectangular cross section as light beam 28 (though it may have different dimensions). The air stream is then passed or directed through the focal position 24 of reflector 14 at any convenient angle to its principal axis, such as perpendicular as shown, and consequently intersecting light beam 28. The intersecting beam of light and stream of air effectively produces a scanning or sensing zone 22 at focal position 24 having a generally parallelepiped shape or form in which the air sample is continuously changing.

Any particles carried by air stream 30 through sensing zone 32 will scatter light from light beam 28 at an intensity proportional to the size of the particle. Any forward scattered light rays, such as is shown by the series of arrows 34, impinges against the reflective surface of reflector 14 and is reflected along lines substantially parallel to its axis, as shown, to reflector 16. The scattered light rays reflect from the reflective surface of reflector 16 to the focal position 26 of the reflector and are detected and measured by light detector and measuring means 22.

Some of the scattered light may not emanate from the focal point of reflector 14 since the focal position 24 and sensing zone 32 include areas on all sides of the focal point. Any scattered light not emanating directly from the focal point is reflected from reflector 14 at an angle to its axis and reflected from reflector 16 to a point not at its focal point but still within focal position 26. The size of sensing zone 32, the curvature of reflectors 14 and 16, the distance between the reflectors and the sensitive area of light detector and measuring means 22 are all chosen so that all light scattered "forward" from sensing zone 32 is reflected to the sensitive area (focal position 26) of light detector 22 regardless of the originating point of the scattered light.

Light scattered by a particle not in the forward direction may be absorbed by the nonreflective, light absorbing surfaces within the optical chamber. Any light from light beam 28 which is not scattered by particles passing through sensing zone 32 may be absorbed by a suitable light trap, such as the elongated, generally horn-shaped, light trap 36. Light trap 36 may be mounted "within" reflector 14 with its opening 38 aligned with the axis of the reflector and with light beam 28. Opening 38 should be large enough to accommodate all or substantially all the unscattered portion of beam 28 including any possible spreading or diverging portions of the beam. A further light absorbing covering or pad 40 may be fastened or bonded to the reflective surface of reflector 14 around opening 38 to insure that only particle scattered light is reflected by the reflector. A similar light absorbing covering or pad (not shown) may be bonded to the central portion of reflector 16 in the same manner to further assure absorption of all unscattered light and any stray or undesirable light which might be reflected to light detector 22 and adversely affect the accuracy of the system.

Light generator and transmitter 18 may include a conventional light source 42, such as a tungsten or arc, white light source or a laser, which generates a steady, continuous beam of light. The light beam generated by source 42 and shown by arrows 43 may be transmitted along a channel or passageway 44 via suitable reflectors or mirrors 46 and 48 and/or lenses (not shown) to the interior of optical chamber 10. The light may be formed into the desired elongated cross section, collimated light beam 28 by suitable slits or openings such as slit 50 and opening 52 in the converging portion 54 of channel 44. Other conventional collimators or collimating systems may be used to insure the formation of a collimated light beam 28. A laser light beam may not require any additional collimation than that provided by opening 52 due to its inherent directionality, low beam divergence and coherency. Typically, opening 52 may have dimensions, depending on the desired volume to be sampled, of about 0.5 inch long by an amount that would produce the desired pulse duration such as about .013 to .03 inch wide.

Air stream generator 20 may include a conventional light proofing labyrinth or air intake (not shown) directed towards or in the area to be monitored and coupled to intake conduit 56. Conduit 56 is shown mounted on and communicating with the interior of optical chamber 10, aligned with the focal position 24 of reflector 14 and the sensing zone 32. Air stream 30 may be formed into the desired elongated cross section by a converging, funnel-like portion 58 terminating with an elongated, rectangular aperture or orifice 60 having the required length and width dimensions. Conduit 56 may be aligned with an exhaust conduit 62 having a flared or funnel-like extension 64 for receiving air stream 30 and directing the air stream along conduit 62. Air stream 30 may be generated by producing a stream of sample air in conduits 56 and 62 as shown by arrows 65 by using an exhaust air blower 66 at the exhaust end of conduit 62. The exhaust of blower 66 may be filtered with a conventional absolute filter 68 to prevent any contamination or recontamination of the area being monitored and to collect the particles for possible later examination.

Blower 66 may be any conventional motor driven impeller or rotor type blower which is capable of pulling the desired volume of air through orifice 60. Typical air volumes may be 10 cubic feet per minute or more through about a 0.7 inch by 0.2 inch orifice.

The scattered light reflected from reflector 16 to focal position 26 may be detected by light detector and measuring means 22 by use of a photosensitive device 67, for instance a photomultiplier tube or photodiode, supported with its sensitive area adjacent position 26 by one or more mounting brackets. Photosensitive device 67 may be coupled by cable 69 to a particle counter circuit 70 which is described more fully below with respect to FIG. 3. The photosensitive device 66 may be selected so as to be sensitive to a particular light frequency to decrease the systems sensitivity to changing particle colors.

The pressure within optical chamber 10 may be maintained equal to that of the monitored area to prevent or minimize dispersion of sampling air within the chamber so as to insure collection of all sample air by conduit 62 by coupling the interior of the chamber to the monitored area through one or more light-proof absolute filters 72. Thus, as blower 66 sucks or pulls air through conduit 62 via conduit 56, air is also discharged through filter 72 to maintain the pressure within chamber 10.

It should be noted that all surfaces of the light transmitter, air stream generator and light detector are preferably coated or painted with a nonreflective, light absorbent coating.

Figure 2:
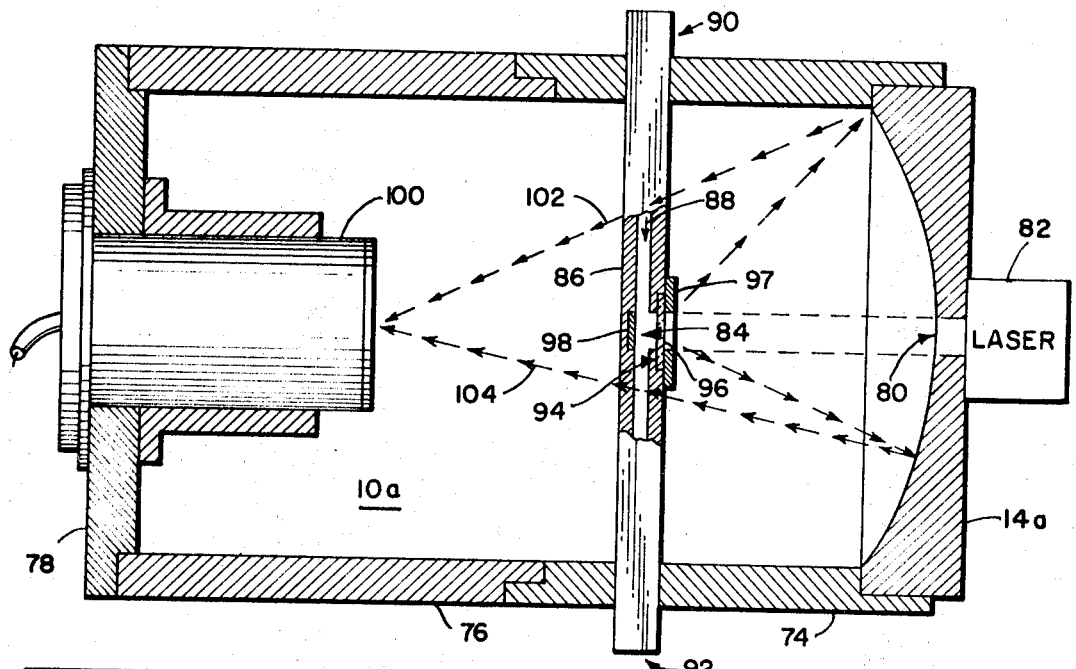
FIG. 2 is a plan view, partially in cross section, of another embodiment of an airborne-particle detection system.

FIG. 2 illustrates an alternative embodiment of the present invention which utilizes a single reflector and a light source which may operate effectively even with its own light output reflected back to the light source. In FIG. 2, optical chamber 10a includes a housing formed by flanged and mating tubular housing members 74 and 76 which aid in assembling and disassembling of the chamber for fabrication and maintenance. The ends of the chamber are enclosed and light sealed by reflector 14a and by end plate 78, respectively.

Reflector 14a includes an elongated, light beam sizing slit or opening 80 aligned with the axis of the reflector and, in the embodiment shown, the longitudinal axis of chamber 10a. A conventional laser 82, such as a helium-neon gas laser or a crystal laser, which is capable of continuous operation may be mounted adjacent opening 80 or coupled to opening 80 through a suitable optical system so as to direct a coherent light beam with cross-sectional dimensions the same as opening 80 along the reflector axis and through the sensing zone 84 similar to beam 28 in FIG. 1. The laser may be powered by a conventional laser power source (not shown). An air stream may be supplied to the sensing zone by an air sample conduit 86 having the proper internal rectangular dimensions to produce an air stream, noted by arrow 88, having an elongated cross section similar to air stream 30 in FIG. 1. Conduit 86 may be coupled to an appropriate air intake and exhaust blower (not shown) to maintain a continuous supply of sample air from intake opening 90 to exhaust opening 92. Conduit 86 is positioned within chamber 10a so that the sensing zone 84 in the conduit is at an object focal point of the reflector axis aligned with the laser light beam. An opening or aperture 94 is provided through the wall of conduit 86 facing reflector 14a to permit the laser light beam to pass through sensing zone 84. Sensing zone 84 is formed by the dimensions of conduit 86 and the laser light beam. Opening 94 may be covered by a suitable transparent, nonscattering window 96 made of a suitable optical quality material to prevent dispersion or leakage of particles into chamber 10a and to provide a completely enclosed sensing zone. A planar, first surface reflector 98 may be mounted in the interior wall of conduit 86 facing window 96. Window 96 may be held in position by a covering bracket 97 which may also enhance accuracy by blocking light which is forward scattered by the laser beam initially passing through the air stream as explained below. A suitable photosensitive device 100 is positioned with its sensitive area facing the reflector and aligned with the reflector axis at the corresponding image focal point of sensing zone 84. The photosensitive device 100 may be mounted as shown with conventional brackets to end plate 78 and connected to a particle counter circuit such as is shown in FIG. 3.

The laser light beam is transmitted through opening 80 in reflector 14a and window 96 to sensing zone 84. Any unscattered light is reflected by planar reflector 98 back through window 96 and opening 80 to laser 82. It has been found that the reflected light does not noticeably degrade the performance of the laser. Any light rays from the reflected laser beam which are forward scattered by particles in the air stream return directly through window 96 to the reflector surface of reflector 14a. Light rays scattered from the laser beam in its first pass through sensing zone 84 are reflected from planar reflector 98 and blocked or masked by covering 97. Reflector 14a in turn reflects the scattered light rays from the reflected laser beam to the corresponding image focal point and the sensitive area of photosensitive device 100. Typical scattered light ray paths are shown by arrows 102 and 104. Any back scattered light from the laser beam is of such low intensity compared to forward scattered light that the photosensitive device or counter circuit may be adjusted so as not to measure this light.

Window 96 may be removed, if desired, and filtered air inputs, such as filter 72 in FIG. 1, provided to the interior of chamber 10a to balance the internal and external pressures or create a flow of air from the chamber into window 84 and prevent dispersion or leakage of particles into the chamber. Air sample conduit 86 may be suitably formed such as with a flared or funnel-shaped air exhaust portion adjacent opening 94 to further insure complete exhaust of the air sample stream.

Figure 3:
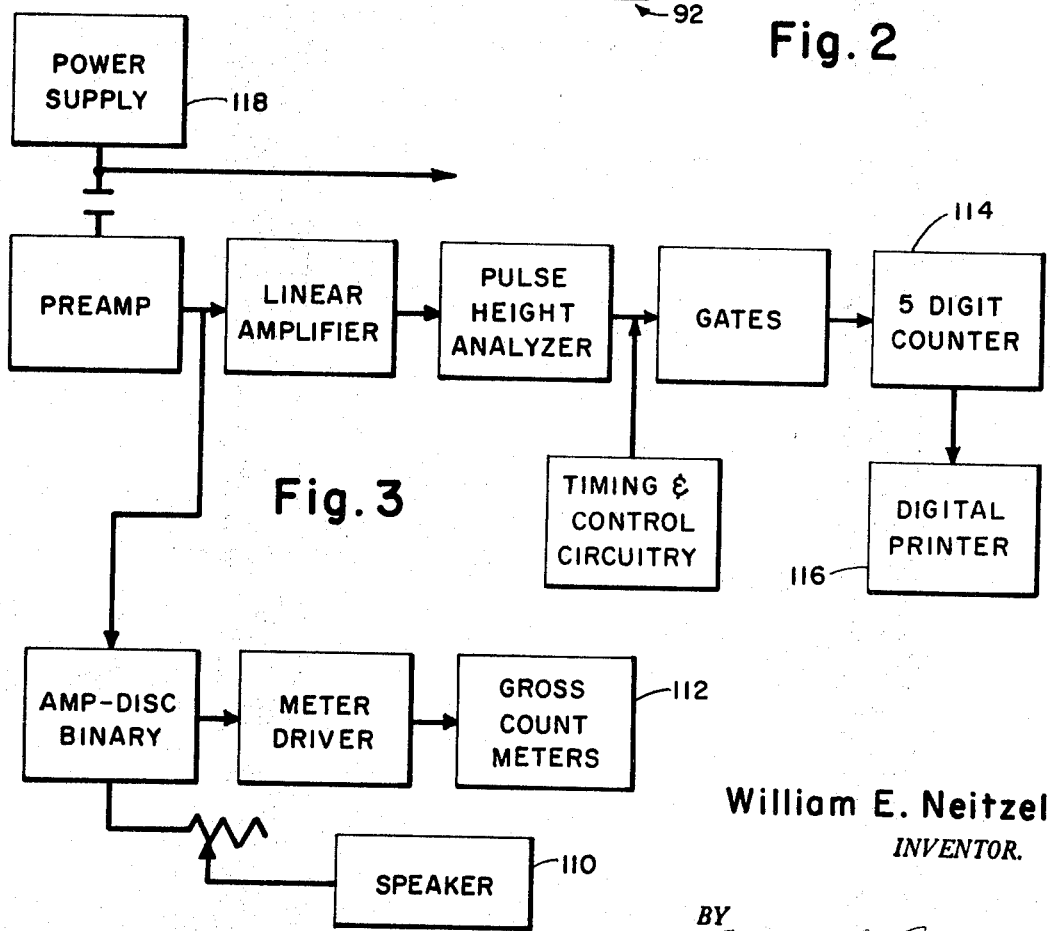
FIG. 3 is a block diagram of a particle counter circuit which may be used with the systems of FIG. 1 and FIG. 2.

A typical particle counter circuit 70 which may be used with the airborne particle detectors of FIGS. 1 and 2 is shown in FIG. 3. Such a circuit provides an aural indication of particles being counted with speaker 110, a visual indication of gross counts of any size or range of size of particles for a real time period using meters 112 and a continuous automatic range scanning and recording of counts of all particle sizes with counter 114 and printer 116. These various indicators may use conventional electronic pulse height analyzing techniques together with conventional digital control and gating circuits as shown by the labeled block diagram. Power supply 118 may be selected depending on the particular type of photosensitive device 66 and 100.

Typical voltage outputs for a photomultiplier tube for various ranges of particle sizes are shown in the following table.

| Particle size range (microns): | Tube output (volts) |
| --- | --- |
| .32–.4 | 0.0064 |
| .4–.5 | 0.010 |
| .5–.64 | 0.016 |
| .64–.8 | 0.025 |
| .8–1.0 | 0.040 |
| 1.0–1.3 | 0.064 |
| 1.3–1.6 | 0.10 |
| 1.6–2.0 | 0.16 |
| 2.0–2.5 | 0.25 |
| 2.5–3.2 | 0.40 |
| 3.2–4.0 | 0.64 |
| 4.0–5.0 | 1.0 |
| 5.0–6.4 | 1.6 |
| 6.4–8.0 | 2.5 |
| 8.0 and larger | 4.0 |

These airborne particle detector systems accurately and reliably measure submicron particles in large air volume systems with fast response times. At a sampling rate of 10 cubic feet per minute, a relatively high percentage of the air passing through a laminar flow clean room at 100 cubic feet per minute per square foot may be monitored. These systems provide low light background and efficient collection of scattered light rays without loss of intensity or distortion and without degradation of response time.

It will be understood that various changes in the details, materials and arrangements of the parts, which have been herein described and illustrated in order to explain the nature of the invention, may be made by those skilled in the art within the principles and scope of the invention as expressed in the appended claims.

I claim:
1. A system for detecting airborne-particles in a high volume sample of air comprising; an optical chamber having an axis, means for directing along said axis a sheetlike beam of collimated light having an elongated rectangular cross section with beam width substantially greater than beam height, means including a conduit having a narrow slitlike passageway for passing a stream of sampling air having an elongated rectangular cross section generally perpendicularly through said light beam at a first position on said axis with air stream width not less than said light beam width and substantially greater than air stream thickness, said air stream and light beam at their intersection forming an elongated rod shaped scanning zone having a rectangular cross section uniformly illuminated throughout the entire volume thereof, concave reflector means having a focal axis coextensive with said chamber axis for reflecting light forward scattered by particles in said air stream at said first position to a second position on said chamber axis, means for measuring light received at said second position, and means for absorbing unscattered light emerging from said air stream.

2. The system of claim 1 wherein said reflector means is a single parabolic reflector and said first and second positions are corresponding image and object focal points of said parabolic reflector.

3. The system of claim 2 wherein said light beam directing means is a laser light source mounted adjacent said reflector with said light beam passing through a slitlike opening in said reflector.

4. The system of claim 3 wherein said air stream passing means is a rectangular conduit having an optical opening in the conduit facing said light beam and a planar reflector on an inner surface facing said opening.

References Cited

UNITED STATES PATENTS 3,431,423  3/1969  Keller _____ 250—218

OTHER REFERENCES

Manufacturing Optician International "Laser Detects Small Particles in Liquids," vol. 21, No. 1, July 1968, pp. 40–42.

WALTER STOLWEIN, Primary Examiner

T. N. GRIGSBY, Assistant Examiner

U.S. Cl. X.R.

250—218; 356—103